Aug. 8, 1944.  H. E. GOLDSTINE  2,355,433
WAVE LENGTH MODULATION CIRCUIT
Filed March 21, 1942
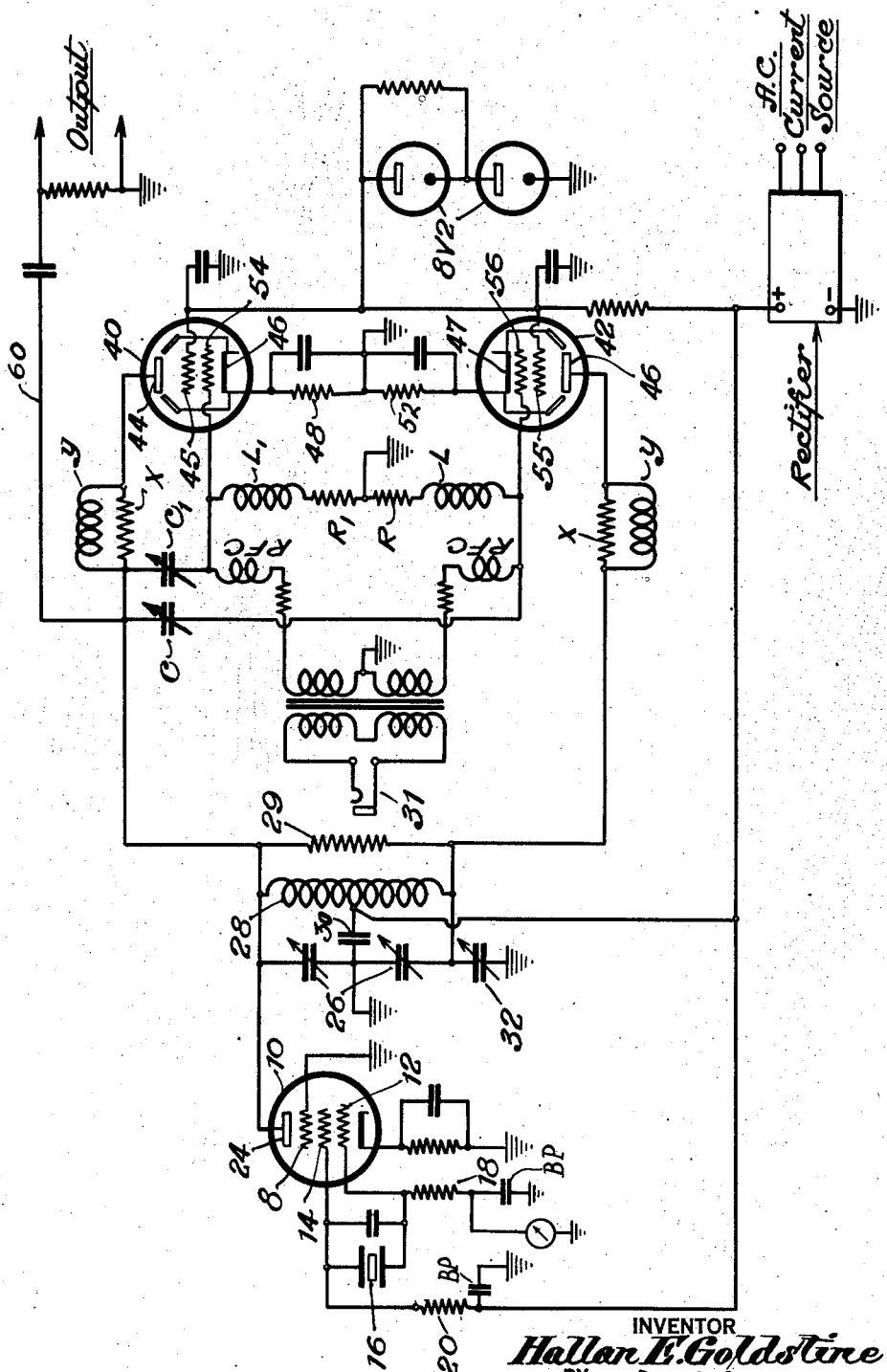
INVENTOR
*Hallan E. Goldstine*
BY
ATTORNEY Patented Aug. 8, 1944

2,355,433

UNITED STATES PATENT OFFICE 2,355,433

WAVE LENGTH MODULATION CIRCUIT

Hallan E. Goldstine, Rocky Point, N. Y., assignor to Radio Corporation of America, a corporation of Delaware Application March 21, 1942, Serial No. 435,654

9 Claims. (Cl. 179—171.5)

This application concerns wavelength modulation such as disclosed in my United States application number 371,075 filed December 21, 1940 now U. S. Patent No. 2,306,052, issued December 22, 1942. A feature of my present invention is the use of parasitic suppression inductance and resistance in the anode leads of the balanced reactance tube modulators of a wave generating and modulating system.

In describing my invention in detail, reference will be made to the attached drawing wherein:

The single figure illustrates by circuit diagram the essential features of a wavelength modulator arranged in accordance with my invention.

Referring to the drawing, tube 10 has its first and second grids 12 and 14 connected with a piezo-electric crystal 16 to form an oscillation generating circuit the frequency of the oscillation of which is dependent nearly entirely on the dimensions of the crystal 16. The electrode 12 is connected to ground by a resistance 18 while the electrode 14 is connected to a positive point on a source of direct-current potential by way of a resistor 20. The source not shown has its negative terminal grounded and the lower ends of resistances 18 and 20 are grounded by bypass condensers BP. The anode 24 of tube 10 is connected with a tank circuit comprising a variable condenser 26 and an inductance 28 connected in parallel. The tuning characteristic of this tank is broadened by resistance 29. A point on the inductance 28 is connected to a source of direct-current potential which may be the source mentioned above or a separate source. This lead is filtered by a bypass and blocking condenser 30 connected to ground.

Adjacent terminals of condenser 26 and inductance 28 are connected to the anode 24. The opposite terminals of the capacity 26 and inductance 28 in the tank circuit are connected by a balancing condenser 32 to ground. A purpose of the condenser 32 is to electrically balance the sides of the tank circuit with respect to its ground or mid-point connection through condenser 30.

Oscillations are produced in the circuits connected with electrodes 12 and 14 of tube 10 of a frequency determined in large part by crystal 16. These oscillations are supplied to the tank circuit connected with the anode 24 substantially by the electron stream only of the discharge device 10. The tank circuit and the anode 24 are shielded from the oscillation generating circuits by a grounding electrode 8 arranged between the electrodes 14 and 24 and connected directly to ground.

The modulator tubes 40 and 42 have their anodes 44 and 46 connected to spaced points on the inductance 28 of the tank circuit. One end of the inductance 28, for example, the anode end thereof, is connected by a phase shifting circuit comprising condenser C1 and inductance L1 and bias resistance R1 to the cathode 46 by way of ground and bias resistance 48. A second phase shifting circuit comprising condenser C, inductance L and resistance R connects the same point on the tank circuit to the cathode 47 of tube 42 by way of ground and bias resistance 52. The grid electrodes 54 and 56 are connected to points on the phase shifting circuits C1, L1, R1, and C, L, R, respectively, to excite the said grid electrodes by voltages of substantially like phase but of a phase displaced about 90 degrees with respect to the phase at the anode 44, and at its point of connection to inductance L. Since the anodes 44 and 46 are connected to opposite ends of inductance 28, the phase of the excitation on the grids 54 and 56 is also displaced 90 degrees with respect to the voltage on the anode 46. These tubes are fed so that the phase of the voltages on the grids of the tubes are displaced essentially 90 degrees relative to their respective plate voltages. In one of the tubes the grid voltage leads the plate voltage by about 90 degrees and in the other tube the grid voltage lags the plate voltage by about 90 degrees. The grid voltage is fed from one side of the plate circuit to both tubes and since the two plates are 180 degrees out of phase this makes the grid voltages appear in their proper relationship to make one tube appear as capacitive and the other tube inductive reactance. As the reactances of the tubes are varied by means of the audio input, one tube will increase inductive reactance and the other will decrease capacitive reactance, and vice versa.

Due to high frequency current in the tank circuit, including inductance 28, voltages are produced on the anodes of tubes 40 and 42 with respect to the cathodes of these tubes. Since the two phase shifting circuits C, L, R, and C1, L1, R1 are subjected to one of these plate voltages, each grid is fed a voltage which is advanced substantially 90 degrees with respect to the said plate voltage. In one tube then the grid voltage leads the plate voltage by about 90 degrees, while in the other tube the grid voltage lags the plate voltage by about 90 degrees. The current pulses in the tubes are in phase with the grid voltage. As a consequence in one tube, say 40, the pulses of current, which reach the anode lead the anode voltage by about 90 degrees and this complex tube reactance is capacitive in nature. In the other tube, say 42, the pulses of current which reach the anode lag the said anode voltage by about 90 degrees and this complex tube reactance is inductive. Varying the intensity of the current pulses varies the values of the complex tube reactances.

Modulation is accomplished by applying modulating potentials from any source, such as, for example, a microphone or a scanner connected by jack 31 through choking inductances RFC to the grid electrodes 54 and 56 in phase opposition. Increasing the potential on the grid 54 increases the current through the tube 40. Increasing the current through the tube 40 decreases the capacitive reactance provided by the said tube. This is equivalent to adding capacity to the tank circuit. Since the modulation is in phase opposition at this time the current through the other tube, say 42, is decreased thereby increasing the inductive reactance provided by tube 42. This has the effect of adding inductance to the tank circuit. The added capacity and increased inductance shunt the tank winding 23 and alters the tune thereof slightly. Both the added shunt capacity and the higher shunt inductance decrease the resonant frequency of the circuit. Increasing the potential of grid 56 and decreasing the potential on the grid 54 has the opposite effect. Thus, the tubes are controlled to vary the reactance of the tank circuit in accordance with the modulating potentials. This modulates the phase of the oscillatory energy in the tank circuit and the phase modulated oscillatory energy may be utilized directly from the tank circuit through lead 60 coupled therewith or may be used after amplification and multiplication to the extent required in frequency multipliers and amplifiers in a unit coupled to 60.

In reactance tube modulators of this type precautions must be taken to eliminate generation of oscillations at parasitic frequencies in the reactance tube circuits which would prevent proper operation of the reactance tube and any circuit to be controlled which is coupled thereto. Most high gain (GM) pentode tubes such as the type 807 used at 40 and 42 have sufficient feed back through the tube to oscillate at high frequency with the leads of the tube (internal and external) forming the oscillating circuit.

To prevent oscillation at these higher or parasitic frequencies I provide a resistance X and inductance Y in each reactance tube anode lead.

The resistance and inductance shown are for high frequency parasitic elimination. The choke offers high impedance to the high frequency and the resistance will provide sufficient loading to stop the tube from oscillation. At the low frequency the choke is of negligible impedance, and offers little effect in the circuit.

The tubes 8V2 are voltage regulator tubes and are placed in circuit so that the voltage on the screen grids 45 and 55 remain essentially constant. These tubes were used when it was found that when there is a large variation in alternate current power line voltage in the transmitter, the output of the received signal varied a small amount. Since the receiver is limiting only the variation in phase deviation will effect the output, so that if the modulator is made constant the phase modulation will not vary with line voltage. The power output may change some, but, due to receiver limiting and AVC this does not effect the output signal. The element most critical to voltage variation is the screen grid voltage and when this is regulated the variation at the output of the receiver is greatly reduced, and is considered unobjectionable.

The system as described is essentially a phase modulator but by the use of a corrected modulating potential, that is, one wherein the modulating potentials are modified substantially inversely in accordance with their frequency, an output having essentially the characteristics of a frequency modulated wave may be derived.

The oscillations in the tank circuit including inductance 28 and condenser 26 may be of the same frequency as the oscillations generated in the circuit including crystal 16 and electrodes 12 and 14 or may be harmonically related to the frequency of the generated oscillations. In one system wherein very good results were obtained the tank circuit 26, 28 was tuned to the second harmonic of the crystal frequency. Tube 10 then is a crystal controlled oscillator and its plate circuit is a frequency doubler. The plate circuit including tank circuit 26, 28 may be tuned to the same frequency as the crystal 16 but some reaction on the crystal may be obtained at low modulation frequencies.

What I claim is:

1. In a wavelength modulation system, an oscillation generator comprising, a tube having a plurality of electrodes regeneratively coupled in an oscillation generating circuit including a reactance, an electron discharge device having an electrode serving as an anode, a cathode and a control grid, a coupling coupling said reactance to the electrode of said device serving as an anode and a coupling coupling the cathode of said device to said reactance, the space between said last two mentioned electrodes being effectively in shunt to at least part of said reactance, a network for impressing voltages from said generating circuit on said control grid which are substantially in phase quadrature relative to the voltages on the anode of said device, means for modulating the impedance of said device in accordance with signals, and means for preventing generation of oscillations at parasitic frequencies in said device including an inductance of high impedance to high frequency oscillations and a loading resistance in one of the couplings between the reactance and the electrodes of said device, said inductance being of low impedance to oscillations of the frequency generated by said first tube.

2. In a wavelength modulation system, an oscillation generator comprising, a tube having a plurality of electrodes regeneratively coupled in an oscillation generating circuit including a reactance, an electron discharge device having an electrode serving as an anode, a cathode and a control grid, a coupling coupling said reactance to the electrode of said device serving as an anode and a coupling coupling the cathode of said device to said reactance, the space between said last two mentioned electrodes being effectively in shunt to at least part of said reactance, a network for impressing voltages from said generating circuit on said control grid which are substantially in phase quadrature relative to the voltages on the electrode serving as an anode of said device, means for modulating the impedance of said device in accordance with signals, and means for preventing generation of oscillations in said device including an inductance of high impedance to high frequency oscillations and a loading resistance in parallel in the coupling between the reactance and the electrode of said device serving as an anode.

3. In a wavelength modulation system, an oscillation generator including, a tube having a plurality of electrodes regeneratively coupled in an oscillation generating circuit including a reactance, a pair of electron discharge devices each having an anode, a cathode and a control electrode, couplings between spaced points on said reactance and the anodes of said devices, a coupling between the cathodes of said devices and a point on said reactance intermediate said spaced points, means for impressing on the control grids of said devices alternating-current voltages of phases displaced by substantially 90° relative to the phases of the alternating-current voltages on the anodes of said devices, means for modulating the impedances of said devices in phase opposition in accordance with signals, and means for preventing generation of oscillations at parasitic frequencies in said devices including an inductance of high impedance to high frequency oscillations and a loading resistance in parallel in the couplings between an electrode of each of said devices and said reactance, said inductance being of low impedance to oscillations of the frequency generated by said first tube.

4. In a wavelength modulation system, an oscillation generator including, a tube having a plurality of electrodes regeneratively coupled in an oscillation generating circuit including a reactance, a pair of electron discharge devices each having an anode, a cathode and a control electrode, couplings between spaced points on said reactance and the anodes of said devices, a coupling between the cathodes of said device and a point on said reactance intermediate said spaced points, means for impressing on the control grids of said devices alternating-current voltages of phases displaced by substantially 90° relative to the phases of the alternating-current voltages on the anodes of said devices, means for modulating the impedances of said devices in phase opposition in accordance with signals, and means for preventing generation of oscillations in said devices including an inductance of high impedance to high frequency oscillations and a loading resistance in parallel in each of the couplings between the anodes of said devices and said reactance.

5. In a system of the class described, a tuned circuit including reactance wherein wave energy, the instantaneous frequency of which is determined in part by said reactance, flows, said reactance including the impedance between an electron receiving electrode and an electron producing electrode in a tube having an electron flow control electrode, with connections between said tuned circuit and the tube electrodes for setting up on said electron receiving electrode and said electron flow control electrode voltages of said wave energy frequency substantially in phase quadrature relation whereby a reactive effect is produced between said electron producing electrode and electron receiving electrode, when operating potentials are applied to said tube electrodes, and included in the reactance of said circuit, connections to electrodes of said tube to control the conductance thereof to thereby correspondingly control the included reactive effect, and a resistance and inductance in parallel in one of the connections between said tuned circuit and said tube electrodes, said inductance being of high impedance to parasitic frequencies and of negligible impedance to lower frequencies, said resistance providing sufficient loading to prevent the development of oscillations in said tube and connections.

6. A system as recited in claim 5 wherein said parallel resistance and inductance are in the connection between the electron receiving electrode and the tuned circuit.

7. A system as recited in claim 5 wherein said tube has a screening electrode between said electron flow control electrode and said electron receiving electrode and a voltage regulated source of potential is connected between said screening electrode and said electron producing electrode.

8. A system as recited in claim 5 wherein said parallel resistance and inductance are in the connection between the electron receiving electrode and the tuned circuit, and wherein a screen grid is in said tube and is maintained at a substantially constant positive potential relative to the potential of said electron producing electrode.

9. In a wave length modulation system a source of high frequency wave energy including a wave generator in the form of a tube having electrodes including an anode and having electrodes coupled regeneratively for the production of oscillations which appear in a tank circuit including parallel inductance and capacity coupled to said anode, an electron discharge device having a control grid, an anode, and a cathode coupled to said tank circuit by a path of low impedance to voltages of the frequency generated, a conductive connection between the anode of the tube and the anode of the device whereby the anode of the device is operating at voltage of the generated frequency and of a first phase, a phase shifting network coupling the tank circuit to the control grid of the device for exciting the control grid by a voltage of the generated frequency and of a phase differing from said first phase by about 90°, whereby a reactive effect is produced in said device and reflected in said tank circuit to control in part at least the frequency of the oscillations generated, a parasitic frequency damping impedance in the conductive connection between the anode of said device and the anode of said tube for preventing generation of oscillations at parasitic frequencies in said device and its connections, a modulation potential transformer having a primary winding arranged to be excited by modulating potentials and having a secondary winding and a high frequency choking inductance connecting said secondary winding to the control grid of said device.

HALLAN E. GOLDSTINE.